United States Patent [19]

Tsukamoto

[11] 4,174,643

[45] Nov. 20, 1979

[54] SILENT GEAR WHEEL

[76] Inventor: Kotaro Tsukamoto, 7-8, Kashima 4-chome, Yodogawa-ku, Osaka, Japan

[21] Appl. No.: 831,682

[22] Filed: Sep. 8, 1977

[51] Int. Cl.² .................. F16H 55/14; F16F 15/10
[52] U.S. Cl. .................................. 74/443; 74/574
[58] Field of Search ............................. 74/443, 574

[56] References Cited

U.S. PATENT DOCUMENTS

| 1,185,953 | 6/1916 | Sundh | 74/443 |
| 1,427,721 | 8/1922 | Christenson | 74/443 |
| 3,385,127 | 5/1968 | Naruse et al. | 74/443 |
| 3,566,710 | 3/1971 | Long | 74/574 X |
| 3,962,932 | 6/1976 | Okamoto et al. | 74/443 X |

*Primary Examiner*—William E. Wayner
*Attorney, Agent, or Firm*—Wenderoth, Lind & Ponack

[57] ABSTRACT

A gear wheel having a rim with a plurality of teeth around the periphery thereof, a hub within the rim, spokes connected between the rim and the hub, sound absorbing material filling the spaces between the spokes for silencing the noise caused by vibration of the gear wheel, and side plates attached to the rim, hub and spokes and completely covering the openings from the spaces between the spokes for confining the sound absorbing material in the spaces.

1 Claim, 2 Drawing Figures

SILENT GEAR WHEEL

The present invention relates to a large-size gear wheel which is, for the purpose of making its weight as light as possible, composed of a toothed rim, a hub and spokes or braces.

The gear wheel according to the present invention is one in which is provided a device for silencing the noise emitted by its rotation in engagement with another gear.

A large-size gear wheel of this type has, in general, a drawback in that, as it rotates in engagement with another gear, it is vibrated by the shock given to its teeth and emits a big noise from the resonation of the braces, such drawback becoming more pronounced when the rate of rotation is higher, that is to say, the noise becoming louder with an increase in the number of revolutions.

The object of the present invention is to provide a gear wheel which it is possible to eliminate such drawback of the conventional gear wheel and to reduce the amount of noise emitted or, more particularly, to provide a silent gear wheel in which the spaces between the braces are filled with sound-absorbing materials, thereby to absorb the noise arising from the resonation of the braces.

Figure 1:
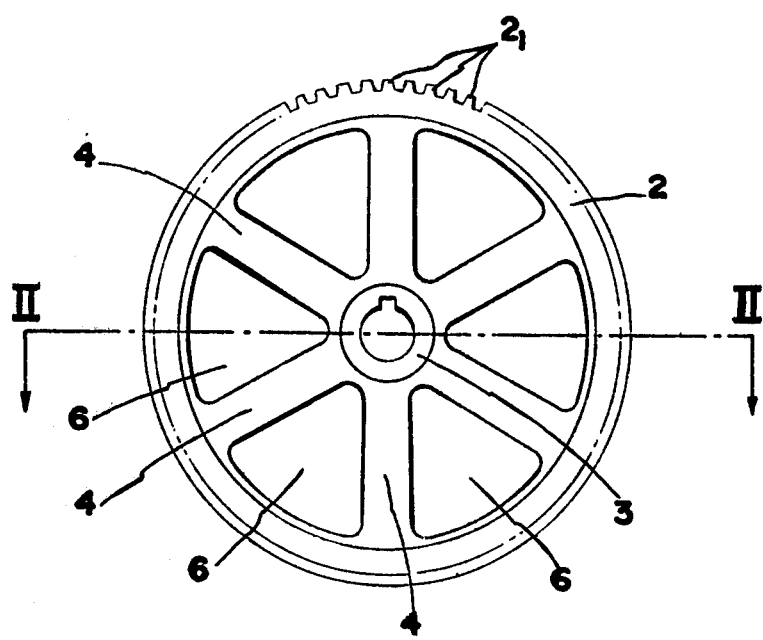
Figure 2:
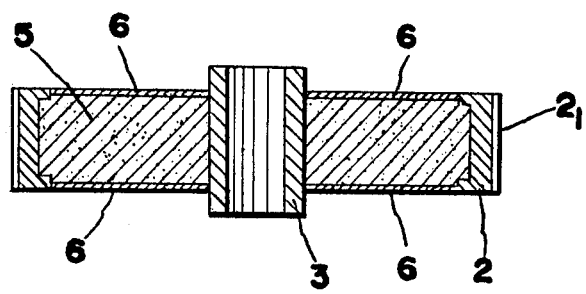

The attainment of the object of this invention will by fully apparent from the detailed description hereinafter set forth with reference to the accompanying drawing, wherein:

FIG. 1 is a front view of a silent gear wheel in accordance with the present invention; and FIG. 2 is a sectional view taken on line II—II of FIG. 1.

The numeral 1 designates a gear wheel consisting of a rim 2 which is provided with teeth $2_1 \ldots 2_1$ around its periphery, a hub 3 and spokes or braces 4 . . . 4, and the spaces between the braces are filled with sound-absorbing materials 5 such as sawdust, thereby to compose a silent gear wheel in accordance with the present invention.

An example of the method of filling the spaces between the braces with sound-absorbing materials is this: in the first instance, the spaces between the braces 4 . . . 4 are walled up on one side of the gear wheel 1 with triangular pieces of steel plate 6 by welding them on or by fastening them on with bolts; then the vessel-like spaces thus formed by the braces 4 . . . 4 and the plates 6 are filled with sound-absorbing materials 5; and finally the vessel-like spaces between the braces 4 . . . 4 are walled up on another side of the gear wheel 1 with pieces of steel plate 6 by welding them on or by fastening them on with bolts. Another example of the method of filling sound-absorbing materials is to wall up the spaces between the braces 4 . . . 4 with pieces of steel plate 6 . . . 6 on both sides of the gear wheel 1 beforehand, and to fill such enclosed spaces formed by the braces 4 . . . 4 and the plates 6 . . . 6 with sound-absorbing materials 5 from a hole bored through each of the plates 6 . . . 6 on one side of the gear wheel 1.

With a silent gear wheel in accordance with the present invention, noise emitted by the braces from their resonation with the vibration of the toothed rim is absorbed by the sound-absorbing materials filled between the braces; so the noise level is very much lower than with a gear wheel having no such device for absorption of sound. In particular, the higher the rate of rotation and consequently the frequency of vibrating sound, the larger is the sound-absorbing effect.

A silent gear wheel in accordance with the present invention can thus prevent the generation of hideous noise resulting from the reduction of weight of the gear wheel and goes a long way toward prevention of too much noise in factories.

What is claimed is:

1. A gear wheel comprising a rim having a plurality of teeth around the periphery thereof, a hub within said rim, spokes connected between said rim and said hub, sound absorbing material filling the spaces between said spokes for silencing the noise caused by vibration of the gear wheel, and side plates attached to said rim, said hub and said spokes and completely covering the openings from the spaces between said spokes for confining the sound absorbing material in said spaces.

* * * * *